Nov. 23, 1926.
C. W. HAWTHORNE
SPOOL FOR HOLDING WIRE
Filed July 27, 1925
1,607,888
2 Sheets-Sheet 1
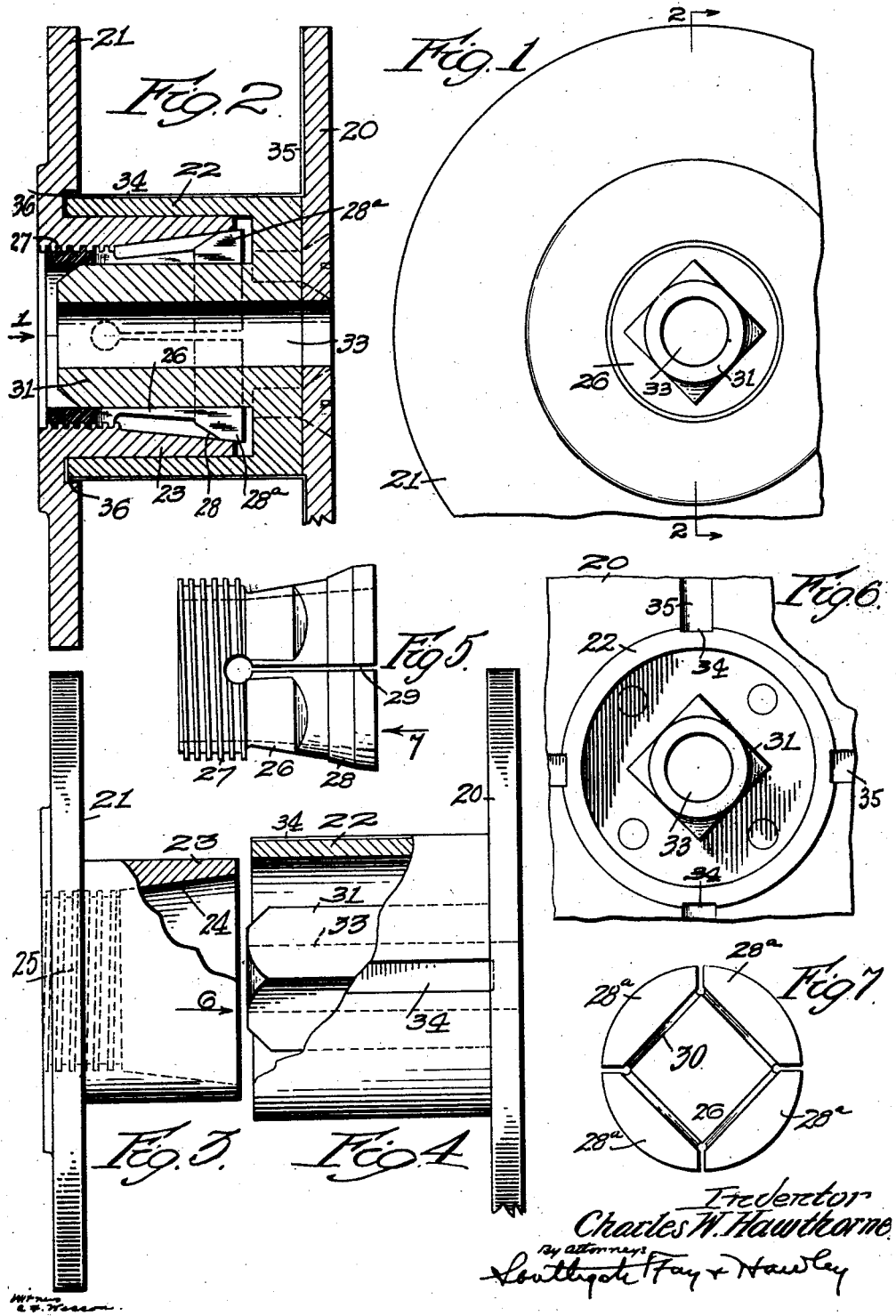

Nov. 23, 1926.  1,607,888
C. W. HAWTHORNE
SPOOL FOR HOLDING WIRE
Filed July 27, 1925    2 Sheets-Sheet 2
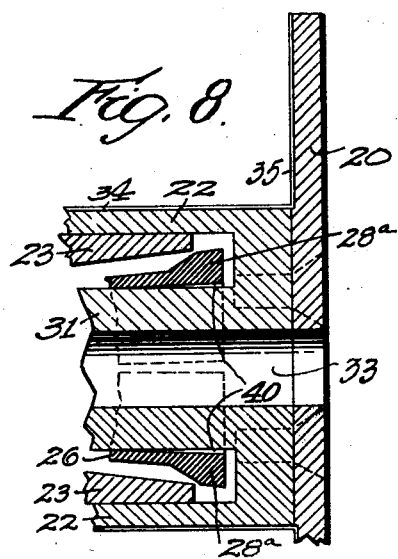
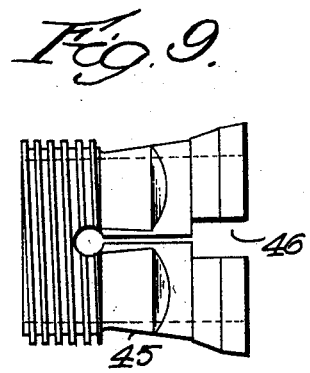
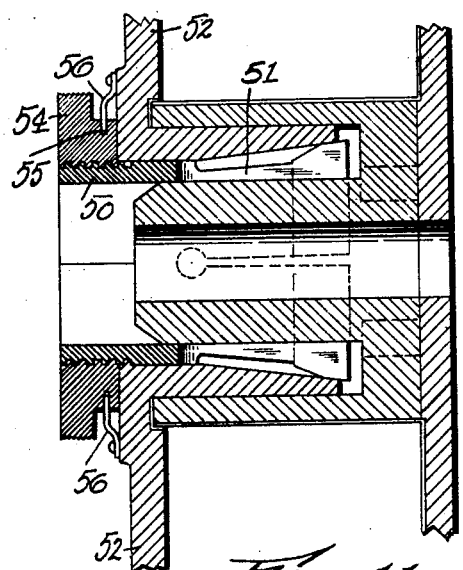
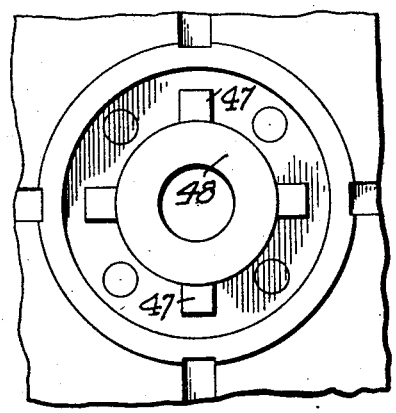

Patented Nov. 23, 1926.

1,607,888

UNITED STATES PATENT OFFICE.

CHARLES W. HAWTHORNE, OF SHREWSBURY, MASSACHUSETTS, ASSIGNOR TO WICKWIRE SPENCER STEEL COMPANY, OF NEW YORK, N. Y., A CORPORATION OF DELAWARE.

SPOOL FOR HOLDING WIRE.

Application filed July 27, 1925. Serial No. 46,275.

This invention relates to a spool for holding wire, such as is commonly used in various wire working machines. It is desirable that such spools be made in separate parts, so that successive coils of wire can be placed thereon, retaining the same spool for repeated use.

It is the object of my invention to provide a spool for such purposes having improved devices for securing the parts together, and so constructed as to permit assembly and separation thereof with very slight labor on the part of the operative.

My invention further relates to arrangements and combinations of parts which will be hereinafter described and more particularly pointed out in the appended claims.

A preferred form of the invention and certain modifications thereof are shown in the drawings in which—

Fig. 1 is a partial side view of my improved spool;

Fig. 2 is a sectional front view, taken along the line 2—2 in Fig. 1;

Fig. 3 is a front elevation, partly in section, of one portion of the spool;

Fig. 4 is a similar view of a section portion of the spool;

Fig. 5 is a front elevation of the locking bushing;

Fig. 6 is a partial side view of the portion of the spool shown in Fig. 4, looking in the direction of the arrow 6;

Fig. 7 is an end view of the locking bushing, looking in the direction of the arrow 7 in Fig. 5;

Fig. 8 is a detail sectional view to be described;

Fig. 9 is a front elevation of a slightly modified form of locking bushing;

Fig. 10 is a partial side elevation, similar to Fig. 6, but showing a construction adapted to cooperate with the bushing shown in Fig. 9, and Fig. 11 is a sectional front elevation, showing a further modification.

Referring to Figs. 1 to 8, my improved spool comprises a pair of heads 20 and 21. The head 20 has a sleeve 22 extending from the inner face thereof, and the head 21 has a sleeve 23 also extending from its inner face and being loosely slidable within the sleeve 22. The sleeve 23 is provided with a conical inner bearing surface 24 and the axial opening through the head 21 and into the sleeve 23 is threaded as indicated at 25.

A locking bushing 26 has a threaded portion 27 fitting the threaded opening 25 of the head 21 and also has a conical bearing portion 28 fitting the conical opening 24 in the sleeve 23. The bushing 26 has a plurality of axially extended slots 29 dividing the bearing portion 28 into several more or less resilient bearing elements 28ª which are capable of slight radial movement.

The bushing 26 has a square or otherwise non-circular opening 30 (Fig. 7) extending therethrough and adapted to receive a similarly shaped projection 31 (Figs. 4 and 6) secured to the head 20 and spaced within the sleeve 22. The projection 31 has a circular axial opening 33 to receive a rod or support upon which the spool may be rotated.

The sleeve 22 is provided with axially extended depressions 34 on its outer surface, which depressions connect with radial recesses 35 in the inner face of the head 20. These recesses and depressions receive the binding wires which encircle the coils during shipment and permit withdrawal of said wires after the spool is assembled.

It will be noted also that the head 21 has an annular recess 36 to receive the end of the sleeve 22. This prevents the falling of loose wires into the space between the end of the sleeve 22 and the face of the head 21 during the unwinding operation. This might otherwise occur if the two parts of the spool were not drawn into close engagement.

The several parts of my improved spool, constructed as described, are assembled as clearly shown in Fig. 2. When the parts are to be assembled, the bushing 26 is turned in the threaded sleeve 23 so as to withdraw it slightly from the conical bearing surface 24 and permit the conical bearing elements 28ª of the bushing to spring outward. The square projection 31 on the head 20 may then be inserted in the bushing by pushing the heads toward each other, sliding the sleeve 22 over the sleeve 23 and advancing the projection 31 into the axial opening of the bushing 26 as far as the axial length of the coil will permit.

When the parts are in close engagement, a slight turn of the head 20 relative to the head 21 will rotate the bushing 26, causing it to advance into the conical opening 24 and causing the bearing elements 28ª to engage the outside of the projection 31 and the conical inner surface 24 of the sleeve 25, thus firmly holding the parts together.

When it is desired to separate the heads, it is merely necessary to turn the head 20 in the opposite direction to slightly withdraw the bushing 26 from the bearing surface 24, after which the heads may be separated by a straight axial movement.

The spool may thus be assembled or separated with very slight expenditure of either time or labor, while the parts are strong and durable and are very firmly held in assembled relation during use. The spool is also adjustable as to length and adapts itself to variations in the lengths of coils.

In Fig. 8, I have indicated a detail of construction which I have found desirable, namely, the provision of a slight clearance 40 between the end portions of the bearing elements 28ª and the projection 31. This construction permits the bearing elements to engage the sleeve 23 with a yielding pressure and with a lever action which increases the binding pressure on the projection 31. By this construction I have found that the parts are more firmly held together and that less effort is required to assemble or separate the parts.

In Figs. 9 and 10, I have indicated a slightly modified construction in which the locking bushing 45 is provided with one or more recesses 46 which receive pins 47 projecting from the outer surface of a cylindrical projection 48 which takes the place of the square projection 31 previously described. The operation of this form of my invention is precisely similar to that first described but the construction is somewhat less expensive.

In Fig. 11 I have indicated a further modification in which the opening in the head 52 and its sleeve is not threaded and in which the threaded portion 50 of the locking bushing 51 extends through the head 52 to receive a knurled nut 54 threaded thereon beyond the head 52. The nut 54 may be recessed at 55 to receive clips 56 which hold the nut 54 close against the head 52. By tightening the nut 54 the bushing 51 will be drawn into the sleeve 57 as previously described, but without rotating the bushing relative to the sleeve. In this respect, the modification has an advantage over the construction previously described.

With both forms of my invention the spool can be very easily assembled and as easily taken apart, and all parts are of such substantial construction that there is small risk of damage thereto.

Having described my improved spool and the advantages thereof, I do not wish to be limited to the details herein disclosed otherwise than as set forth in the claims, but what I claim is:—

1. A spool for holding wire comprising a pair of heads having telescoping portions extending laterally therefrom, an expansible bushing, and means to move said bushing axially to bind said telescoping portions from relative axial movement.

2. A spool for holding wire comprising a pair of heads each having a sleeve extending laterally therefrom, one of said sleeves enclosing the other, an expansible bushing positioned within said sleeves, and means to move said bushing to hold said heads from relative axial movement, said bushing having a threaded connection with one of said heads and having a sliding but non-rotatable connection with the other head.

3. A spool for holding wire comprising a pair of heads each having a sleeve extending laterally therefrom, one of said sleeves fitting within the other sleeve and being freely rotatable therein, said inner sleeve having a conical inner bearing surface and being threaded at the smaller end thereof, an expansible locking bushing having a conical bearing portion and having a threaded portion fitting said inner sleeve, and means to turn said bushing in said sleeve to bind said heads from relative axial movement.

4. A spool for holding wire comprising a pair of heads each having a sleeve extending laterally therefrom, one of said sleeves fitting within the other sleeve and being freely rotatable therein, said inner sleeve having a conical inner bearing surface and being threaded at the smaller end thereof, and an expansible locking bushing having a conical bearing portion and having a threaded portion fitting said inner sleeve, said bushing having a non-circular axial opening therein, and the head having the outer sleeve having also an inner non-circular projection fitting within said opening in said bushing, whereby said bushing may be turned by rotation of said head to contract said bushing on said non-circular projection and thereby bind said heads from axial movement.

5. A spool for holding wire comprising a pair of heads having telescoping portions extending laterally therefrom, an expansible bushing between said portions, and means to move said bushing axially to binding position between said telescoping portions, said bushing having a plurality of separately yieldable engaging elements, and said elements being formed with inner clearance at their ends, thereby producing increased pressure by a lever action against the inner telescoping portion as said bushing is moved to clamping position.

6. A spool for holding wire comprising a pair of heads having telescoping portions extending laterally therefrom, and having non-parallel adjacent faces, an expansible bushing slidable between said adjacent faces, and means to move said bushing axially to binding position between said telescoping portions.

7. A spool for holding wire comprising a pair of heads having telescoping portions extending laterally therefrom, and having non-parallel adjacent faces, an expansible bushing slidable between said adjacent faces, and means to move said bushing axially to binding position between said telescoping portions, said bushing being held from rotation relative to one of said heads.

8. A spool for holding wire comprising a pair of heads having telescoping portions extending laterally therefrom, an expansible bushing slidable between said telescoping portions to binding position between said telescoping portions, and having a threaded end portion extending through one of said heads, and a nut threaded on said bushing outside of said head and rotatable relative to said head to move said bushing axially between said telescoping portions.

9. A spool for holding wire comprising a pair of heads having telescoping portions extending laterally therefrom, an expansible bushing slidable between said telescoping portions to binding position between said telescoping portions, and having a threaded end portion extending through one of said heads, a nut threaded on said bushing outside of said head and rotatable relative to said head to move said bushing axially between said telescoping portions, and means to prevent separation of said nut and head.

In testimony whereof I have hereunto affixed my signature.

CHARLES W. HAWTHORNE.